United States Patent [19]

Chant

[11] Patent Number: 4,835,999
[45] Date of Patent: Jun. 6, 1989

[54] ANTI-THEFT DEVICE FOR AUTOMOBILES
[75] Inventor: Philip Chant, North Wales, Pa.
[73] Assignee: Bluepoint Industries, Inc., Chalfont, Pa.
[21] Appl. No.: 230,371
[22] Filed: Aug. 10, 1988

Related U.S. Application Data

[63] Continuation of Ser. No. 914,245, Oct. 2, 1986, abandoned.
[51] Int. Cl.$^4$ .............................................. E05B 65/12
[52] U.S. Cl. ...................................... 70/238; 70/199; 70/202; 70/247
[58] Field of Search ................................. 70/198–203, 70/211, 237, 238, 245, 247, 249, 254, 230, 212–214

[56] References Cited

U.S. PATENT DOCUMENTS

| | | | |
|---|---|---|---|
| 1,362,377 | 12/1920 | Weidner | 70/203 |
| 3,245,239 | 4/1966 | Zaidener | 70/238 X |
| 3,550,409 | 12/1970 | Pariser | 70/238 |

FOREIGN PATENT DOCUMENTS

| | | | |
|---|---|---|---|
| 807760 | 7/1951 | Fed. Rep. of Germany | 70/199 |
| 609750 | 8/1926 | France | 70/202 |
| 925217 | 8/1947 | France | 70/199 |
| 865204 | 4/1961 | United Kingdom | 70/199 |
| 2021499 | 12/1979 | United Kingdom | 70/203 |
| 2142889 | 1/1985 | United Kingdom | 70/247 |

Primary Examiner—Gary L. Smith
Assistant Examiner—Suzanne L. Dino
Attorney, Agent, or Firm—Joseph W. Molasky & Assocs.

[57] ABSTRACT

A device which protects against the unauthorized taking of an automobile by rigidly joining the shaft of a gearshift lever to the grip portion of a hand brake. The device has application to autos equipped with a console mounted gearshift and parking brake and includes a plunger activated lock assembly having easily releaseable features.

11 Claims, 2 Drawing Sheets

ANTI-THEFT DEVICE FOR AUTOMOBILES

This is a continuation of application Ser. No. 914,245 filed Oct. 2, 1986, now abandoned.

This invention relates to an anti-theft device for an automobile equipped with a console mounted shift and parking brake.

The device of this invention locks the auto in gear by rigidly joining the shaft of the gearshift lever to the handgrip portion of the hand brake so that neither instrument can be put into an operable mode or released until the apparatus is disengaged. The device has expansible features which allow it to be applied to console mounted gearshifts and brakes in cars equipped with either an automatic or manual transmission.

The apparatus can be engaged and disengaged in seconds and all contacting surfaces are coated with films which obviate the likelihood of damage due to abrasion or scratching.

BACKGROUND

To avoid and discourage theft automobile owners have resorted to a variety of protective devices including the use of alarms.

However, there is a difficulty with alarms because they fail to distinguish between unauthorized entry and an inadvertent mistake. It is known, for example, that auto alarms can be easily set off by an accidental tap of the bumper or a pedestrian's inadvertent nudge. Such occurrences can be embarrassing and time-consuming to correct and experience has shown that they occur with more frequency than bona fide attempts at surreptitious entry.

Moreover, battery powered alarms can be circumvented because they depend for their efficacy on cables which can be easily interrupted. In addition, such alarm systems are relatively expensive to install and they required maintenance and period inspection.

For these reasons, many automobile owners, particularly those having a prestige or luxury car, tend to use an indoor facility or a parking lot which employs an attendant. However, such alternatives are not always available, convenient or reliably supervised and the cost for such services can be prohibitively expensive when used on a regular basis.

Accordingly, there is a need for a locking device which is inexpensive, reliable and relatively simple to install and remove.

THE INVENTION

It is an object of this invention to provide for an auto-locking device which is cost-effective to produce and which can be installed easily in automobiles equipped with console mounted gearshifts and parking brakes. This device rigidly joins the gearshift to the parking brake so that the automobile cannot be put into gear in an automatic transmission, or taken out of gear in a manual transmission and driven away nor can it be rolled to a new location by the application of a pushing force.

Another object provides for an auto locking device which is highly visible to an intruder and which, in its disassembled mode, is uniquely compact and capable of being stored easily beneath the seat or within the glove compartment. These and other objects will be apparent from the following description which details the construction and means by which the present device is employed.

The device of this invention is comprised of several discrete members which cooperate to form an extensible assembly for joining the shaft of an auto gearshift lever to the parking brake. This assembly includes at one end an elongated body having a hollow chamber equipped with means for receiving the handgrip portion of said brake.

At the opposite end there is provided a generally F-shaped member which is slidingly engaged within a hollow sleeve so that the operator can extend or withdraw this piece to the desired extent and lock it in place at the correct length for the vehicle. The opening in this member engages the shaft of the gearshift lever and, in its assembled mode, the device is made rigid and secured via a locking step which is described below.

The locking means consists essentially of a shrouded lock equipped with a depressable plunger which is joined by welding means or the like to the hollow sleeve. Once the device has been properly positioned the plunger is depressed for communication with an accommodating orifice in the extension member as a result of which the device is made rigid. Disengagement is achieved by withdrawing the plunger from said orifice as, for example, by the use of a key or other suitable means, whereupon, said sleeve and said F-shaped member are slidingly disengaged so that the device may be removed and the automobile may be operated in the conventional manner.

This invention will now be illustrated by reference to the Drawings and Preferred Embodiments.

THE DRAWINGS

DESCRIPTION OF THE PREFERRED EMBODIMENTS

Figure 1:
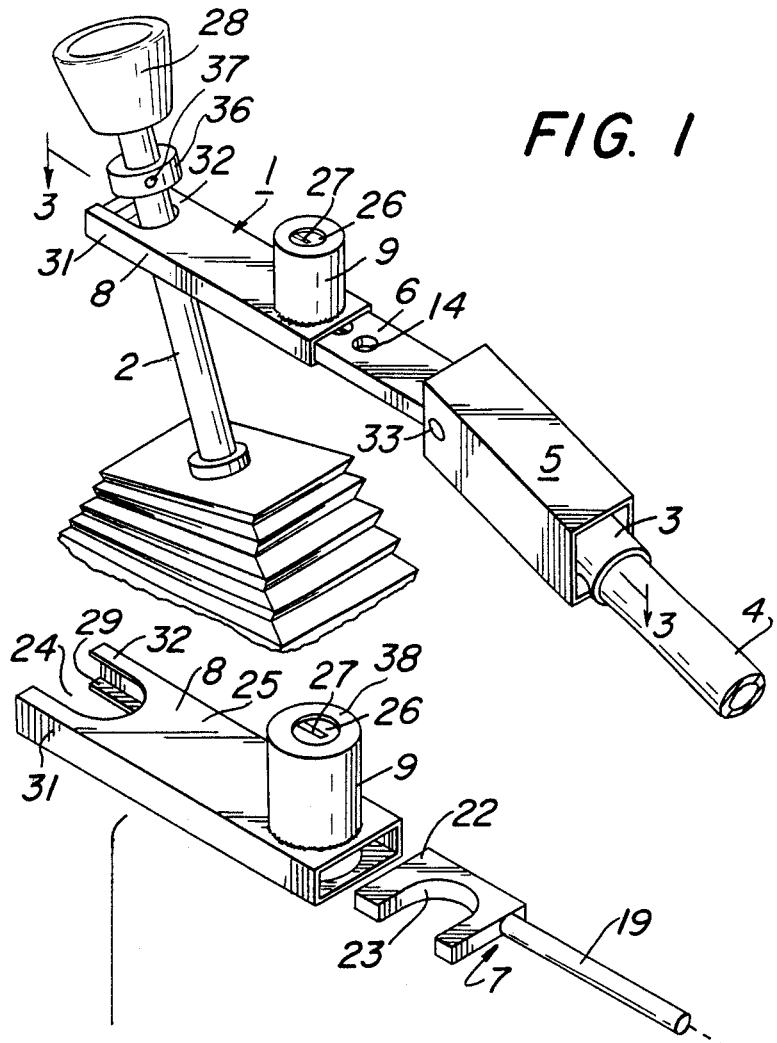
FIG. 1 is a perspective view of the present device shown in combination with a hand brake and a gearshift lever.

The device of this invention is shown generally as 1 in FIG. 1 in an engagement mode with the shaft of a gearshift lever 2 joined to the handgrip 3 of a parking brake 4.

Essentially, this device consists of an elongated hollow body 5 for receiving said handgrip and a retaining element 7 equipped with means for engaging said gearshift lever.

Figure 4:
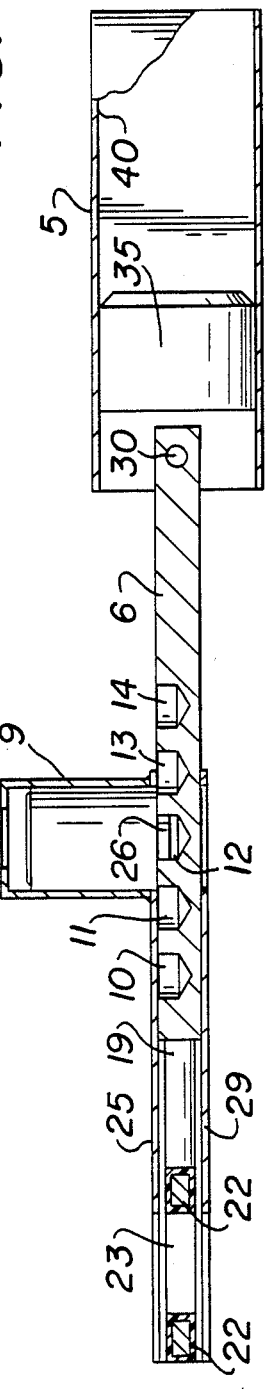
FIG. 4 is a sectional view taken on line 4—4 of FIG. 3.

Within the hollow body 5 there is secured to the interior sidewalls 40 (FIG. 4) a concavity, 35 for accepting the handgrip 3. This cavity may be secured to said sidewalls by any appropriate means as, for example, by an adhesive or the like. In FIG. 4 this concavity is shown to be an annular construction but this configuration is not critical and its exteriority may vary so long as it affords an appropriate recess into which the handgrip may be fitted. Included within the concavity 35 is a centrally disposed orifice (not shown) for receiving the release button commonly associated with parking brakes of this type.

Figure 2:
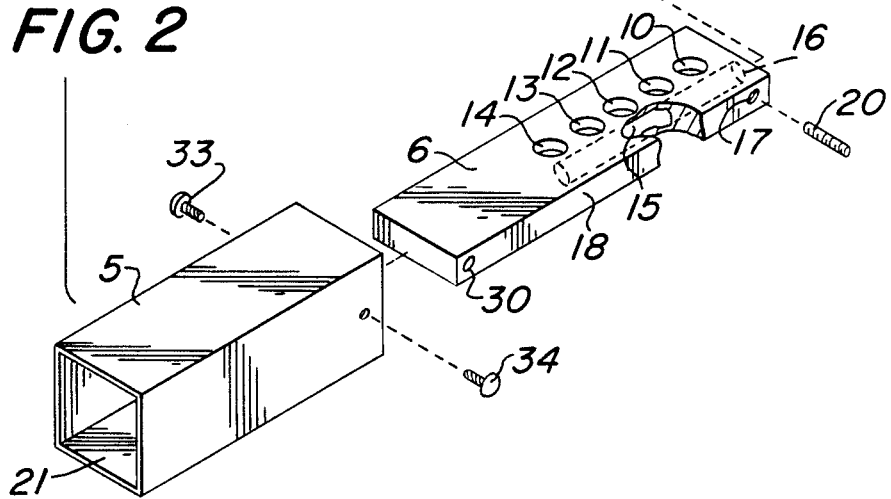
FIG. 2 is a perspective view of said device in its disassembled mode.
Figure 3:
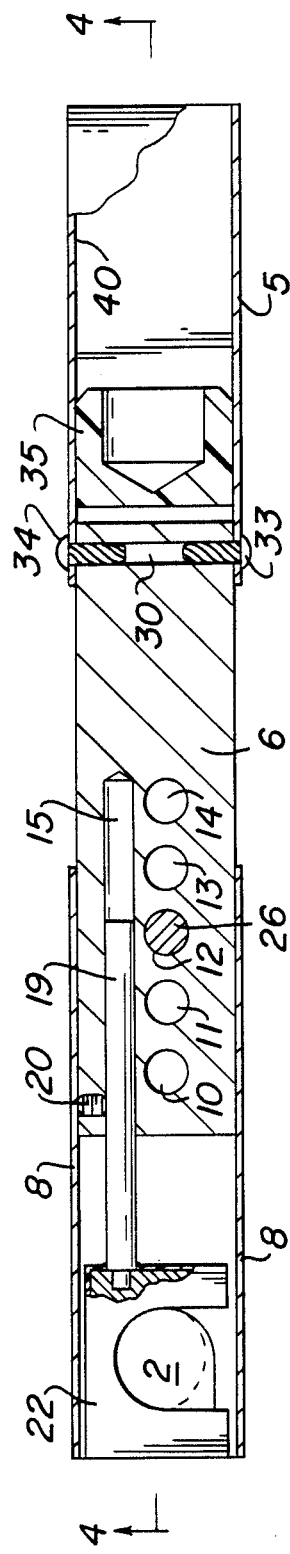
FIG. 3 is a sectional view taken on line 3—3 of FIG. 1.

Hingedly secured to the hollow body 5 via rivets 33 and 34 and the accommodating orifice 30 is an extension member 6. This member is a solid piece into which has been milled serial apertures 10–14 for accepting plunger 26 of the shrouded lock shown as 9 in FIG. 2. Also included within the extension member, adjacent to apertures 10–14, is a longitudinal bore 15 which terminates in a bore opening 16 for receiving the circular rod 19 of the retaining member 7. Perpendicular to the longitudinal bore 15, within sidewall 18, is a threaded orifice 17 for receiving a set screw 20 which, when threaded, comes into engagement with rod 19 (FIG. 3). As a result of this engagement rod 19 is securely retained within the longitudinal bore 15 and it will remain in a locked mode until the screw 20 is disengaged.

The retaining element 7 is a generally F-shaped member consisting of a circular rod 19 and a flat segment 22 into which has been milled an arcuately-shaped cutout 23. The dimensions of this segment 22 are such that it may be slidingly inserted within the elongated sleeve 8 for communication with the arcuately-shaped cutout identified as 24 in FIG. 2.

The elongated sleeve 8 consists of an upper surface 25 to which a shrouded lock 9 has been adjoined by a suitable weld. An overlapping flange 38 circumscribes the top of said lock and protects against forceful removal as, for example, by the use of a lockpuller tool or the like. This lock includes a plunger 26 which can be made to engage any one of apertures 10–14 by depressing the plunger 26 and which can be released or disengaged by inserting a key (not shown) into keyway 27 with a turning motion. Also included on both the upper surface 25 and lower surface 29 at their respective terminal ends, are cutout portions which lie in registry with one another to form the arcuate segment identified as 24 in FIG. 2.

This invention will now be illustrated by describing the installation and use of the present device in an automobile equipped with a gearshift lever and parking brake.

Installation is effected by first placing the parking brake in 'On' position and the gearshift lever in a 'Park' mode. The open end 21 of the hollow body 5 is then placed onto the handgrip 3 of the parking brake 4 and the threaded screw 20 is turned in a counterclockwise direction so that rod 19 can be slidingly extended within bore 15 and its cutout portion 23 can be brought into engagement with the shaft of gearshift lever 2. Once this engagement has been achieved screw 20 is rotated in a clockwise direction to re-engage rod 19 and the hollow sleeve 8 is impressed forward until end segments 31 and 32 engage the cutout portion 23 as shown in FIGS. 3 and 4. As a result, the cutout 23 and segments 31 and 32 form an enclosure around shaft 2 (FIG. 1) and this locking mode is secured by simply depressing plunger 26 into one of receiving apertures 10–14.

This invention also provides for securing to the gearshift lever 2 an anti-theft assembly in the form of an annular ring 36 which is held in place by a screw 37. This assembly makes it impossible for an unauthorized user to disengage the present device 1 from its locked position by removing the handle 28 and sliding the sleeve 8 upwardly on the gearshift lever 2. The annular ring 36 precludes this occurrence by presenting itself as an obstacle beyond which the sleeve 8 and retaining member 7 cannot pass. The ring is installed by positioning same at the desired height on the gearshift lever 2 and securely tightening the set screw 37. This screw is equipped with a breakaway head so that once the ring has been installed the head can be broken off to prevent its removal.

To release the locking device a key (not shown) is inserted into the keyway 27 with a slight turn so as to release the plunger 26 from its accommodating aperture. Thereupon, the sleeve 8 is drawn away from segment 22 so as to expose the cutout 23 and the gearshift is withdrawn from the cutout opening. The hollow body 5 is then lifted from the handgrip 3 so that the automobile can be operated in the conventional manner.

This invention has been described by reference to precise embodiments but it will be appreciated by those skilled in the art that this concept is subject to variation and modification and to the extent that these are within the skill of the artisan to effect, said variations and modifications are included within the scope of the appended claims.

What is claimed is:

1. An anti-theft device for locking the shaft of an auto gearshift lever to a parking brake which comprises:
   (1) an elongated hollow body having a longitudinal chamber which includes a concavity for receiving the grip portion of a hand brake;
   (2) a solid flat extension member of rectangular configuration hingedly secured within said chamber, said member having an upper surface, a lower surface, opposing sidewalls and opposing endwalls and including:
      (a) a plurality of apertures which are serially arranged along a line to extend into said member;
      (b) a longitudinal bore extending for about half the length of said member and having an axis parallel to and spaced from said aperture line and terminating in a bore opening which is adapted to receive the circular rod of the member described in (3) infra;
      (c) a set screw and a threaded bore which is adapted to receive the set screw in perpendicular communication with said longitudinal bore;
   (3) a generally F-shaped retaining member consisting essentially of a flat segment having an arcuate cutout to which has been joined a circular rod which is slidingly engaged within said longitudinal bore and which may be held in place by threadedly engaging said set screw within said threaded bore;
   (4) a hollow elongated sleeve which slidingly receives said extension member, said sleeve having an upper surface, a lower surface and sidewall surfaces, including on said upper surface a lock equipped with a depressable plunger for engaging an aperture in said extension member and further including on said upper and lower surfaces at their terminal ends, arcuately shaped cutouts which lie in registry to receive the shaft of said gear shift lever.

2. The device according to claim 1 wherein the F-shaped in said element and the arcuate cutouts of said sleeve are superimposed to form an orifice which concentrically engage said shaft.

3. The device according to claim 2 wherein said shaft includes an annular ring which is secured immediately above said device so as to prevent it from being slidingly disengaged.

4. The device according to claim 3 wherein said ring is secured to said shaft by a screw which is equipped with a breakaway head.

5. The device according to claim 1 wherein said F-shaped retaining member and said sleeve are coated to provide a film which protects the shaft of said gear shift lever from abrasion.

6. The device according to claim 5 wherein said coating is a film of rubber or plastic.

7. The device according to claim 1 wherein the cavity in said elongated hollow body is comprised of rubber or plastic.

8. An anti-theft device for locking the shaft of an automobile gearshift lever to a parking brake comprising:

an elongated body having a longitudinally extending chamber extending inwardly from one end thereof for receiving the grip portion of a parking brake, a flat extension member hingedly secured at the other end of said body to extend in a longitudinal direction therefrom, said extension member having a flat upper surface and a flat lower surface, a plurality of apertures formed in a portion of said extension member, said apertues being arranged in a spaced apart serial relationship along the length of said extension member, a longitudinal bore in said extension member extending longitudinally inwardly from one end thereof, spaced from and along side of said apertures and providing a bore opening in said one end of said extension member, a retaining member including a flat segment portion defining a cutout for surrounding a portion of the shaft of a gearshift lever, said retaining member including a rod portion slidingly received in said longitudinal bore in said extension member and extending therefrom in a longitudinal direction to join with said segment portion, means for securing said retaining member in a set position relative to said extension member, an elongated sleeve having a longitudinally extending internal chamber for slidably receiving said segment portion of said retaining member and the portion of said extension member having said apertures formed therein, said sleeve having an upper wall located adjacent said upper surface of said extension member and a lower wall located adjacent said lower surface of said extension member, said sleeve having wall means cooperable with wall means of said retaining member and said extension member so that said sleeve is slidable longitudinally relative to said retaining member and said extension member, and a lock means mounted on said upper wall and including a depressible plunger for engaging an aperture in said extension member, said sleeve having a cutout at an extended end thereof adapted to surround a portion of the gearshift lever shaft, said cutout in said retaining member and said cutout in said sleeve member cooperating to form a locking enclosure extending completely around the gearshift lever shaft when said device is in its locking position.

9. A device according to claim 8 wherein said means securing said retaining member in a set position provides releasable frictional engagement between said rod and said extension member.

10. A device according to claim 8 wherein said means for securing said retaining member in a set position relative to said extension member comprises a set screw threadedly received in said extension member in a threaded bore therein and movable into contact with said rod portion of said retaining member to provide a one-time setting to adjust to different size vehicles, and sleeve being constructed and arranged to enclose said set screw and the threaded bore receiving the same when said device is in its locking position to prevent access to the set screw and tampering with the setting position thereof.

11. A device according to claim 8 including a shroud welded on said upper wall and constructed and arranged to enclose the side and a portion of the top wall of said lock means.

* * * * *